(12) United States Patent
Giacomini

(10) Patent No.: US 9,993,744 B2
(45) Date of Patent: Jun. 12, 2018

(54) ATMOSPHERIC WATER GENERATION SYSTEMS

(71) Applicant: SEAS Société de l'Eau Aerienne Suisse SA, Lugano (CH)

(72) Inventor: Flavio Giacomini, Borgomanero (IT)

(73) Assignee: SEAS Société de l'Eau Aerienne Suisse SA (CH)

( * ) Notice: Subject to any disclaimer, the term of this patent is extended or adjusted under 35 U.S.C. 154(b) by 150 days.

(21) Appl. No.: 14/776,370

(22) PCT Filed: Jan. 31, 2014

(86) PCT No.: PCT/IB2014/000096
§ 371 (c)(1),
(2) Date: Sep. 14, 2015

(87) PCT Pub. No.: WO2014/140707
PCT Pub. Date: Sep. 18, 2014

(65) Prior Publication Data
US 2016/0030858 A1    Feb. 4, 2016

Related U.S. Application Data

(60) Provisional application No. 61/799,107, filed on Mar. 15, 2013.

(51) Int. Cl.
*F25D 21/14* (2006.01)
*B01D 5/00* (2006.01)
(Continued)

(52) U.S. Cl.
CPC ......... *B01D 5/0057* (2013.01); *B01D 5/0075* (2013.01); *B01D 5/0087* (2013.01);
(Continued)

(58) Field of Classification Search
CPC .. B01D 5/0057; B01D 53/265; B01D 5/0075; B01D 5/0087; B01D 5/0093; E03B 3/28;
(Continued)

(56) References Cited

U.S. PATENT DOCUMENTS 6,002,105 A * 12/1999 Tamada ............. B60H 1/00064
                                                    219/202
6,755,037 B2 * 6/2004 Engel ..................... F24F 3/1405
                                                    62/150
(Continued)

FOREIGN PATENT DOCUMENTS

EP        0003964 A1    9/1979
EP        0019143 A1    11/1980

OTHER PUBLICATIONS

Chris Nook, Helix, "The Four Most Common Uses of Electric Linear Actuators", Mar. 21, 2013, http://blog.helixlinear.com/bid/244253/The-Four-Most-Common-Uses-of-Electric-Linear-Actuators.*
(Continued)

*Primary Examiner* — Orlando E Aviles Bosques
(74) *Attorney, Agent, or Firm* — St. Onge Steward Johnston & Reens, LLC

(57) ABSTRACT

An atmospheric water generation system, including a casing into which an air treatment unit and a chiller unit are located, the air treatment unit being provided with a first air inlet for ambient air and a first air outlet, the chiller unit being provided with a second air inlet and a second air outlet, wherein a respectively closing member is directly associated to each first and second air inlet and outlet. The system thus can additionally be used as an air conditioning unit, when the cooled and demoistured air from the air treatment unit is directed to a closed work space. The system may addition-
(Continued)

ally include a water treatment unit and a power generating unit for stand alone purposes.

20 Claims, 5 Drawing Sheets

(51) Int. Cl.
| | | |
|---|---|---|
| *B01D 53/26* | (2006.01) | |
| *E03B 3/28* | (2006.01) | |
| *F25D 23/00* | (2006.01) | |
| *F24F 3/14* | (2006.01) | |
| *C02F 1/32* | (2006.01) | |
| *C02F 1/28* | (2006.01) | |
| *C02F 1/78* | (2006.01) | |

(52) U.S. Cl.
CPC ......... *B01D 5/0093* (2013.01); *B01D 53/265* (2013.01); *E03B 3/28* (2013.01); *C02F 1/283* (2013.01); *C02F 1/32* (2013.01); *C02F 1/78* (2013.01); *C02F 2307/10* (2013.01); *F24F 2003/144* (2013.01); *F24F 2003/1446* (2013.01); *F24F 2203/021* (2013.01); *F25D 23/003* (2013.01); *Y02A 20/109* (2018.01)

(58) Field of Classification Search
CPC .... C02F 1/283; C02F 1/32; C02F 1/78; C02F 2307/10; F24F 2003/144; F24F 2003/1446; F24F 2203/021; F25D 23/003
USPC .......................................................... 62/285
See application file for complete search history.

(56) References Cited

U.S. PATENT DOCUMENTS

| 8,398,733 B2* | 3/2013 | Melikyan | B01D 53/265 |
| | | | 55/385.1 |
| 2004/0244398 A1* | 12/2004 | Radermacher | E03B 3/28 |
| | | | 62/285 |
| 2011/0296858 A1* | 12/2011 | Caggiano | B01D 53/06 |
| | | | 62/94 |

OTHER PUBLICATIONS

International Preliminary Report on Patentability Application No. PCT/IB2014/000096 dated Jan. 13, 2015; Date of Completion: Jun. 17, 2015 pp. 5.
International Search Report & Written Opinion Application No. PCT/IB2014/000096 Date of Completion: May 8, 2014; dated May 21, 2014 pp. 10.

* cited by examiner

ATMOSPHERIC WATER GENERATION SYSTEMS

FIELD OF THE INVENTION

The present invention relates to the field of atmospheric water generation systems and more particularly to integrated air conditioning and atmospheric water generation systems that condense water from air to provide drinking water.

BACKGROUND OF THE INVENTION

Potable drinking water is a shrinking resource around the world. It is in short supply in many parts of the world, and in the future it will become more even challenging to supply the water requirements of growing populations. Climate change effects have begun to alter expected weather and water patterns, and these changes, combined with an ever-increasing human population and increased water requirements for domestic, agriculture and industrial sectors has led and will lead to shortages.

The problem is particularly acute in places such as tropical islands, and floating installations such as oil rigs, and at remote or tropical locations that lack a water supply infrastructure. For example, on many islands, consumers must purchase expensive bottled water, or refill water jugs with water of questionable purity at local water stations. There are no wells, most houses are not on city water and even if they are, the city water is not potable. Many homes use rain water runoff guttered into a cistern sanitized with bleach.

In other locations lacking a water piping infrastructure, such as in the Middle East, the typical water source is delivered "jug water," obtained from local water sources. Such water is often of questionable purity and flavor.

The problem is also found in places where the existing water infrastructure has not been maintained. Water pipes may leak, cisterns may be cracked, such that the quantity of available water is less than amounts available a century ago. In addition, such systems also are at risk for contamination of the water supply from such leaks and from other causes.

Ambient air typically contains moisture. The amount of water in ambient atmospheric air varies with temperature, air humidity and pressure. Hot humid air contains more water than cold dry air. Moisture contained in ambient air condenses into liquid form as droplets when the air temperature drops below a determined dewpoint.

Many atmospheric water generating machines have been proposed in the past. The typical machine has a cooling element that receives filtered ambient air and cools the air to condense moisture. The condensation is collected, sterilized by UV light and/or ozone, and stored and/or dispensed. The temperature of the cooling element is maintained so that is does not reach the freezing point which would decrease water collection efficiency. However, such systems, whether large or small, have been dependent on an electrical system infrastructure to operate the systems. Small water cooler size systems, while portable, have insufficient capacity to supply the needs of a substantial population. Larger installations are all custom built and are not designed to be readily deployed using standard commercial transport systems.

SUMMARY OF THE INVENTION

Starting from this background an object of an embodiment of the present invention is to provide an improved atmospheric water generating apparatus which is readily transported and deployed using standard commercial transport systems.

Another object is that of reaching this goal with a simple and rational solution.

These and other objects are achieved by the embodiments of the invention as defined in the independent claim. The dependent claims define preferred or particularly advantageous aspects of the embodiments of the invention.

In accordance with one embodiment of the invention, an atmospheric water generation system, comprises a casing into which an air treatment unit and a chiller unit are located, the air treatment unit being provided with a first air inlet for ambient air and a first air outlet, the chiller unit being provided with a second air inlet and a second air outlet, wherein a respectively closing member is directly associated to each first and second air inlet and outlet.

According to a first aspect of the invention the closing member directly associated to the first air inlet is a louvered shutter.

According to a second aspect of the invention, the closing member directly associated to the first air outlet is a door hinged to a vertical edge of the first air outlet.

According to a third aspect of the invention, the door is configured to be rotated between a closed position and an open position wherein the door is rotated of a predetermined angle with respect to a side of the casing. The predetermined angle is comprised in a range between 30° and 80°, and preferably the predetermined angle is equal to 60°.

According to a further aspect of the invention, the closing member directly associated to the second air inlet comprises a door.

The door is configured to be rotated between a first closed position wherein it closes said second air inlet and realize a portion of an external side of the casing, and a second open position wherein it is located in a plane perpendicular to the side allowing the flow of the ambient air towards the chiller unit.

According to a further aspect of the invention, the closing member directly associated to the second air outlet comprises a door.

The door configured to be rotated between a first closed position wherein it closes said second air outlet and realizes a portion of a ceiling of the casing, and a second open position wherein the door is located in a plane perpendicular to the ceiling allowing the flow of the ambient air from the chiller unit towards the environment.

According to a further aspect of the invention the atmospheric water generation system comprises also a water treatment unit located in the casing.

According to a further aspect of the invention, the atmospheric water generation system comprises also electric generator system located in or on the casing.

Preferably the water treatment unit and the electric generator system are co-located adjacent each other within the casing.

DETAILED DESCRIPTION OF THE INVENTION

Referring now to FIGS. 1-5, where like numerals indicate the same elements in the Figures, an atmospheric water generation system 20 is shown.

Atmospheric water generation system 20 comprises at least an air treatment unit 40 associated with a chiller unit 80, and a water treatment unit 100.

Figure 3:
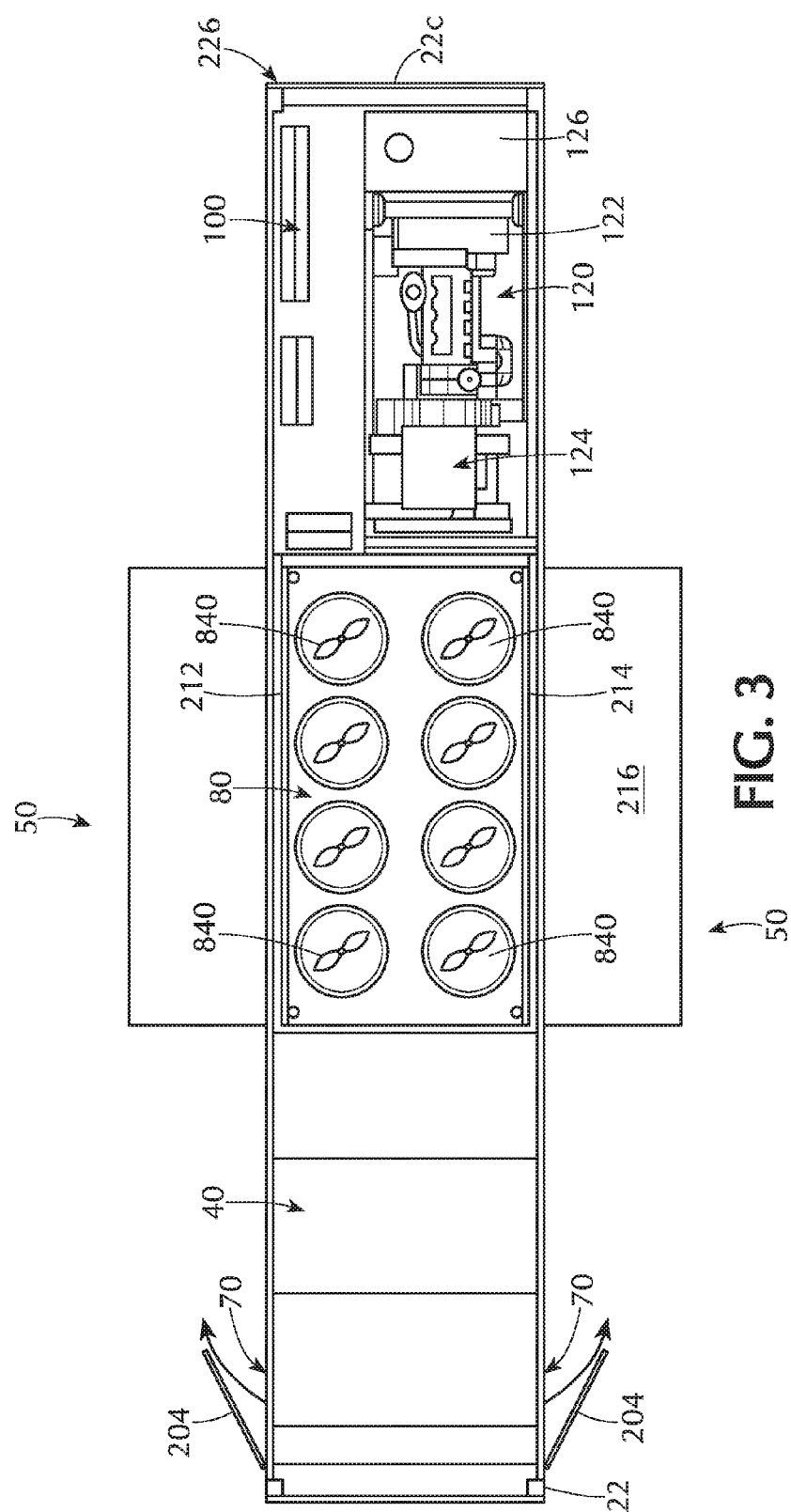
FIG. 3 is a top plan view of a preferred embodiment of the atmospheric water generation system 1 with its top exterior wall removed to display the internal components thereof.

According to the illustrated embodiment of the invention the atmospheric water generation system 20 comprises an electric generator system 120 (FIG. 3).

Atmospheric water generation system 20 is a high performance integrated water production machine which is assembled into a casing 10 having a parallelepiped shaped and comprising a tubular frame 28 (FIG. 2) externally closed by metallic undulated panels 221. The casing 10 has a standard shipping container size, specifically a container 22 which is the size of a ISO standard 40' high-cube container (length 12.19 m×width 2.44 m×height 2.90 m) (40'×8'×9'6"). According to different embodiment of the invention larger casing may also be used including a 45' high cube container size, but in most cases the 40' high-cube container size is easily transportable and is sufficient for the invention.

Casing 22 is seen in FIGS. 1-5, and contains the air treatment unit 40, the chiller unit 80, the water treatment unit 100, and the generator system 120. In general, the air treatment unit 40, the chiller unit 80, are each sized to occupy approximately one-third of the casing 22, while the water treatment unit 100 and the generator system 120 are sized to be co-located in the remaining third of the casing 22.

The casing 22 is provided with a first ambient air inlet 42, having a rectangular shape, for supplying a stream of ambient air to the air treatment unit 40, as seen in FIGS. 1-5, and a first air outlet 70, having a rectangular shape, to discharge demoisturized cold air from the air treatment unit 40.

A closing member is respectively associated to the air inlet 42 and to the air outlet 70. According to this embodiment of the invention the closing member associated to the air inlet is an adjustable louvered shutter 202, powered by an electric motor not illustrated, while the closing member associated to the first air outlet 70 is a door 204 hinged to a vertical edge of the rectangular air outlet 70 so that it can be rotated between a closed position wherein the door is co-planar with the external surface of a side 22a of the casing 22, and an open position, wherein the door is rotated of a predetermined angle with respect to the side 22, so that an air stream can flow throughout the air outlet.

The opening angle of the doors 204, with respect to sides 22a, is comprised in a range between 30 and 80°, preferably the opening angle is equal to 60°.

Figure 4:
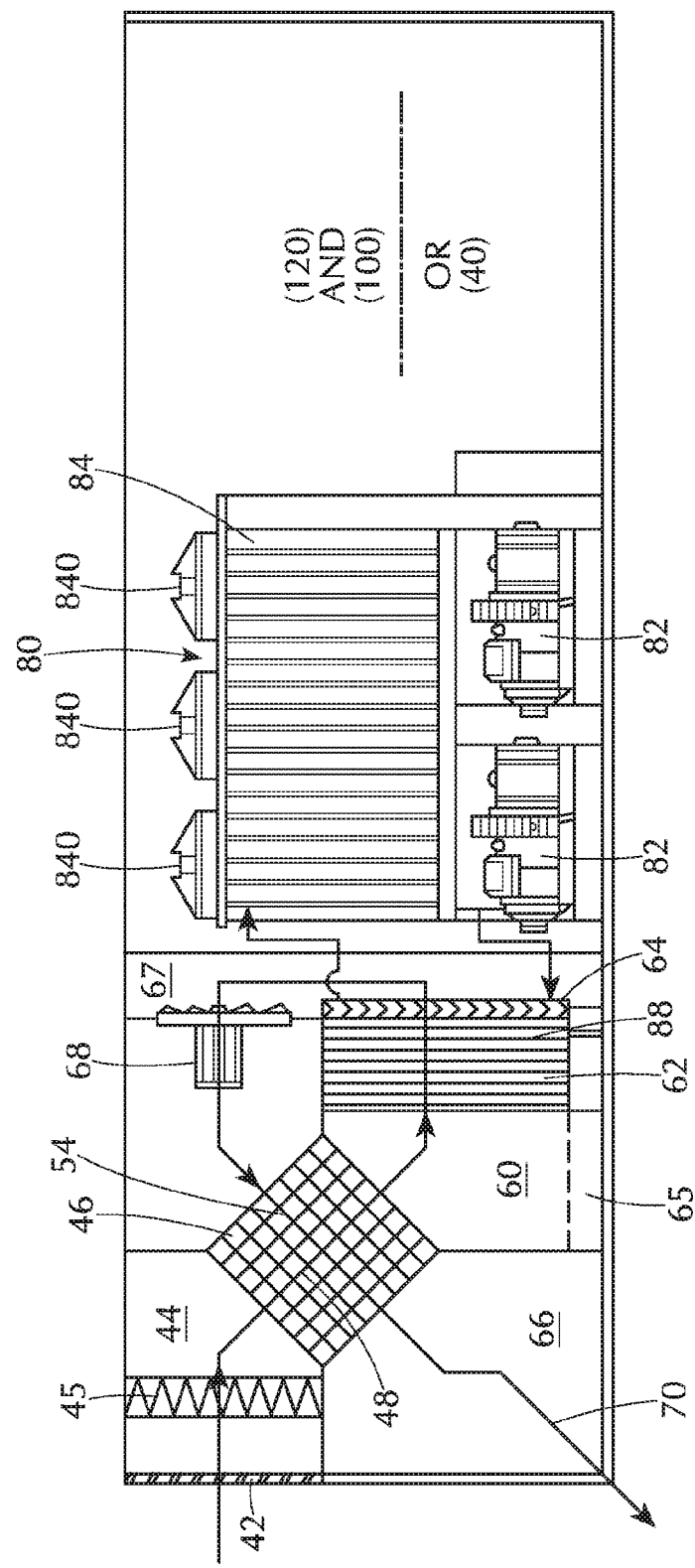
FIG. 4 is a side elevation schematic view of the atmospheric water generation system of FIG. 1 showing alternative options for the location of the water treatment unit and generator system.

With reference to FIG. 4, the air treatment unit 40 comprises an inlet chamber 44 extending from the inlet 42. An air filter system 45 is provided in the inlet air chamber 44 for removing insects, windblown debris, dirt, sand and other contaminants from the incoming ambient air stream. Inlet air chamber 44 connects to a crossflow air to air heat exchanger 46 having a first heat exchange area 48 and a second heat exchange area 54. The first heat exchange area 48 has a first inlet receiving air from the inlet chamber 44 and a first exit for discharging air. The second heat exchange area 54 has a second inlet and a second exit. The crossflow heat exchanger 46 operates to precool the incoming air stream before the air reaches the water condensing heat exchanger 62 where water is condensed from the air and collected.

A condensation chamber 60 extends from the crossflow heat exchanger first exit 52. The water condensing tube and plate heat exchanger 62 is located in the condensation chamber 60. Surfaces of the water condensing heat exchanger 62 are chilled to below the dew point, and accordingly water vapor in the air stream condenses out of the air stream and onto the plates and other surfaces of the water condensing heat exchanger 62. A drop separator 64 (mist eliminator) is located downstream of and adjacent to the water condensing heat exchanger 62 and collects entrained water droplets from the air stream.

Figure 5:
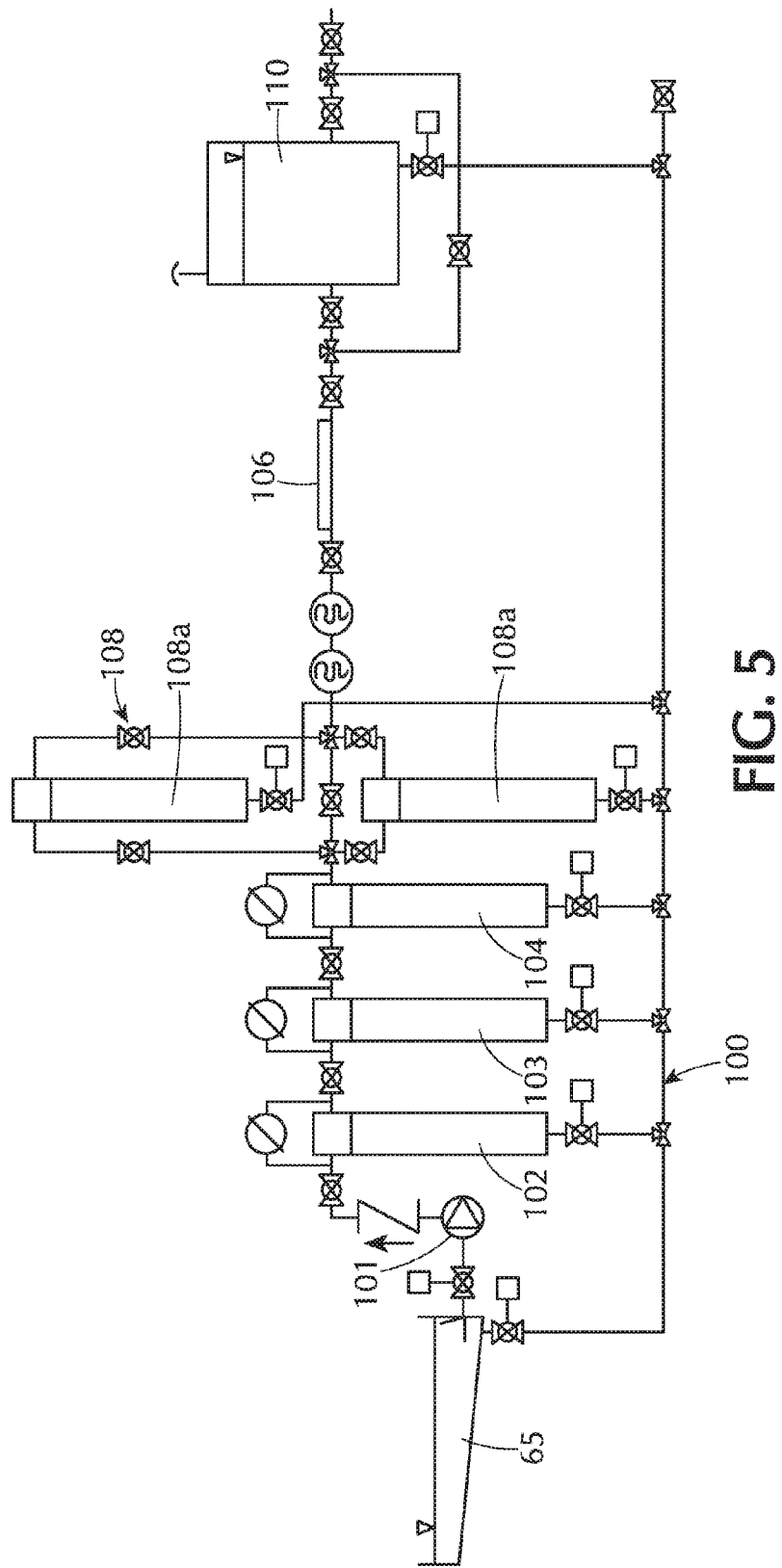
FIG. 5 is a side elevation schematic view of an embodiment of a water treatment unit of an atmospheric water generation system in accordance with the invention.

A water collecting container 65 is located below the water condensing heat exchanger 62 and the drop separator 64 so that condensed water that is collected on the chilled surfaces of the water condensing heat exchanger 62, and which runs down the walls of the water condensing heat exchanger 62 by gravity, is collected. The water collecting container is hydraulically connected to the water treatment unit 100, by means of a pump 101 for pumping the collected water to the water treatment unit 100. (FIG. 5)

An air recirculation chamber 67 extends from the water condensing heat exchanger 62 to the second inlet 56 of the crossflow heat exchanger 46. Air stream that has passed through the crossflow heat exchanger 46 and it has been precooled, and which has then been significantly further cooled by passage through the water condensing heat exchanger 62, is thus returned to the crossflow heat exchanger 46 to provide cooling to the incoming air stream.

Cooled demoisturized air exits the crossflow heat exchanger 46 from the second exit 58 of the crossflow heat exchanger 46 into an outlet chamber 66 (FIG. 4). Outlet chamber 66 exhausts the cooled demoisturized air to the first air outlet 70. In the preferred embodiment, the casing comprises two laterally located air outlets 70 (FIG. 3) on sides 22a of the container 22, but the air outlet 70 may be located elsewhere, such as in an end wall of container 22, as desired.

The circulation of the air stream in the air treatment unit is established by the operation of a blower 68, which is preferably located in air recirculation chamber 67. Air blower 68 may be any type of energy efficient blower system known in the art and may include centrifugal fans and axial fans. Although a single appropriately sized blower may be used, to better fit the blower units in the casing 22, there are preferably two smaller blower units 68 provided side-by side. Alternatively, air blower 68 may be located in the outlet chamber 66, or any of the other chambers 44, and 60.

The chiller unit 80 is also located in the casing 22 adjacent to the air treatment unit 40.

Chiller unit 80 may be based on any of a number of known cooling technologies, however, in most applications a conventional vapor compression refrigeration cycle will be the most robust and versatile system. Thus, the chiller unit 80, as shown in FIG. 4, is a refrigeration system comprising a coolant fluid circulating through a compressor 82, a condenser 84, an expansion valve (not shown), and an evaporator 88 and a plurality of powered fans 840.

The casing 22 is provided with a second ambient air inlet 50 for supplying ambient air to the chiller unit 80, as seen in FIGS. 1-5, and a second air outlet 51 to discharge hot air from the chiller unit 80 to the environment.

Figure 1:
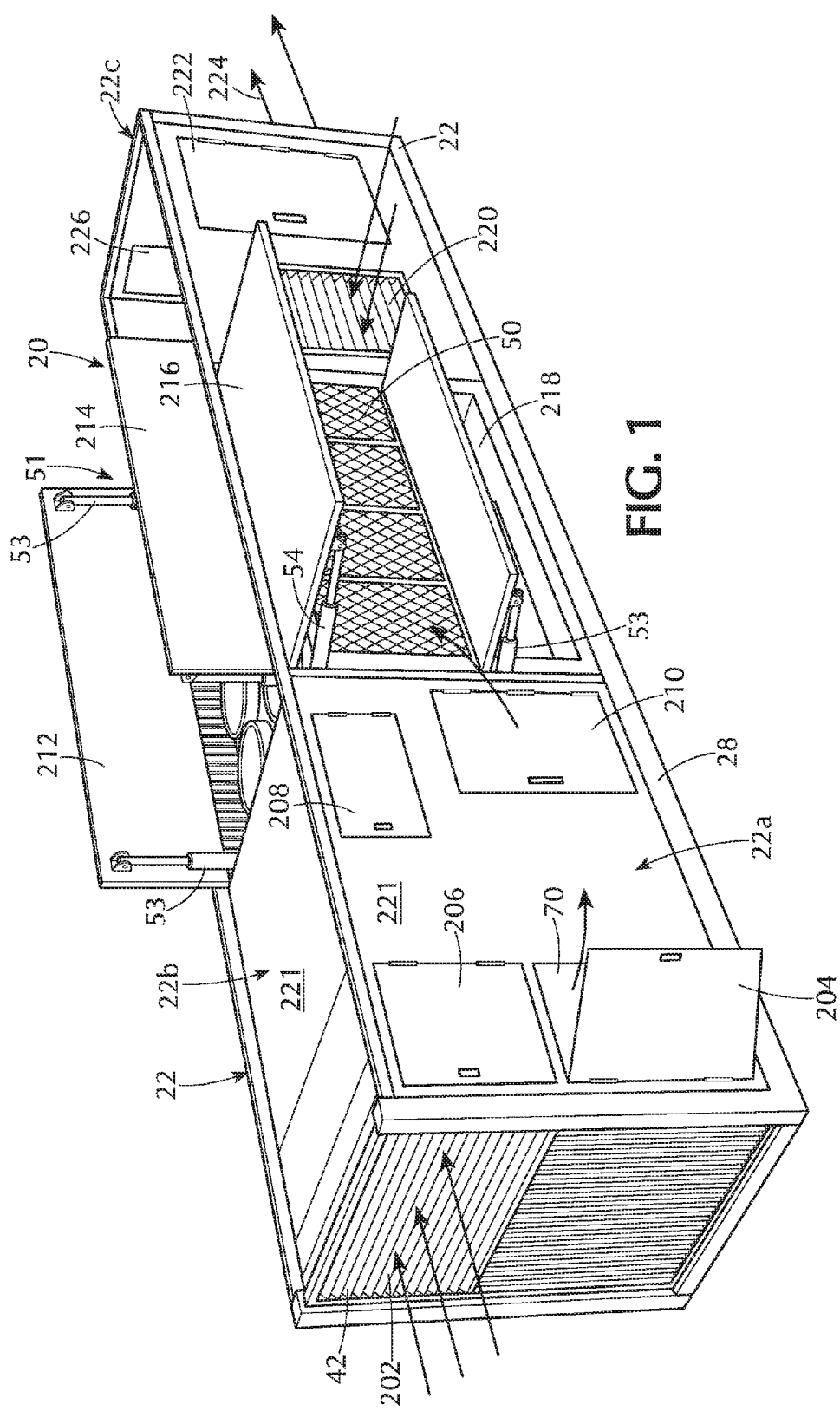
FIG. 1 is a side and top perspective view of an embodiment of an atmospheric water generation system in accordance with the invention.

According to this embodiment of the invention the second air inlet is located on a side of the casing while the second air outlet is located on a ceiling 22b of the casing 22 (FIG. 1).

A closing member is respectively associated to the second air inlet 50 and to the second air outlet 51.

According to this embodiment of the invention the closing member associated to the second air inlet comprises two doors 216,218 each of them being hinged to a respective horizontal edge of the second air inlet 50 so that they can be rotated between a first closed position wherein the doors 216,218 close said second air inlet 50 and realize a portion of the external side 22a of the casing 22, and a second open position wherein the doors 216,218 are located in a plane perpendicular to the side 22a allowing the flow of the ambient air towards the chiller unit.

According to a preferred embodiment of the invention (FIG. 3) the casing 22 is provided with two second air inlets 50, opposite each other, and a closing member is associated to each second air inlet 50. The closing member may comprise two doors identical to the doors 216,218 described in the illustrated embodiment of the invention or it may comprise only one door having the same dimension of the second air inlet.

The closing member associated to the second air outlet 51 comprises two doors 212,214 each of them being hinged to a respective horizontal edge of the second air outlet 51 so that they can be rotated between a first closed position wherein the doors 212,214 close said second air outlet 51 and realize a portion of a ceiling 22b of the casing, and a second open position wherein the doors 212,214 are located in a plane perpendicular to the ceiling 22b allowing the flow of the ambient air from the chiller unit 80 towards the environment.

The rotation of the doors 212,214,216,218 associated to the second air inlet 50 and the second air outlet 51 can be performed by means of linear actuator 53, 54 such as a hydraulic cylinder, a gas cylinder or an electric actuator.

According to a different embodiment of the invention the closing member associated to the second air outlet 51 may comprise only one door instead of the couple of doors 212,214.

During the operation of the atmospheric water generation system 20 all the doors 212,214,216,218 of the chiller unit 80 are in the open position so that a stream of air flows through the chiller unit thanks to the operation of the fans 840.

As told above, during the operation of the atmospheric water generation system 20, the doors 204 of the air treatment unit are opened of a predetermined angle with respect of the side 22a of the casing. As a consequence they advantageously act as a deflector directing the demoisturized cold air flowing though the first air outlet 70 of the air treatment unit to the second air inlet 50 of the chiller unit.

This solution allows to a reduction of the energy consumption of the chiller unit and a general increase of the performance of the same, being the air, supplied to the chiller, demoisturized and at a temperature lower than the ambient air.

Figure 2:
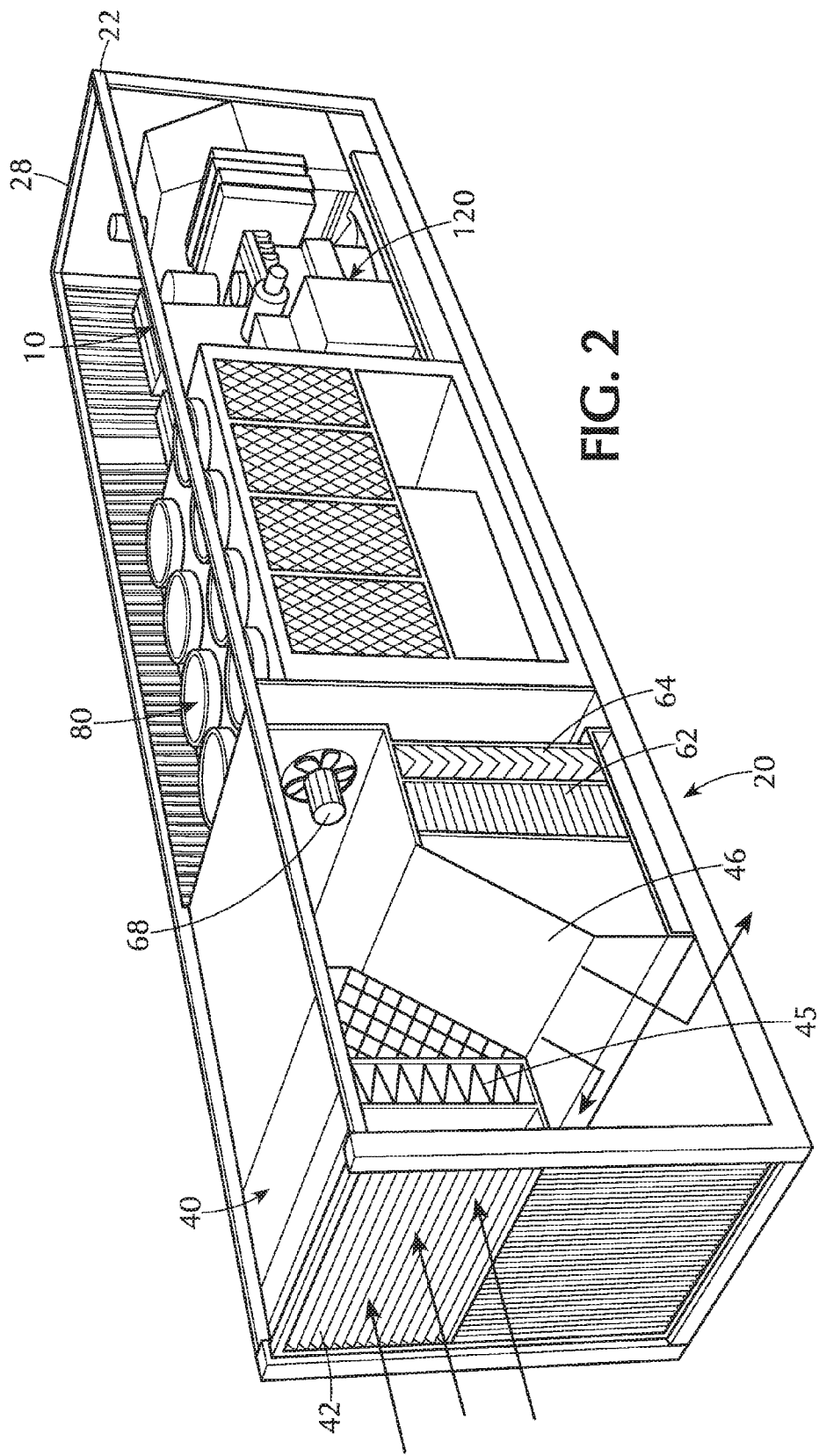
FIG. 2 is a front, side and top perspective view of the atmospheric water generation system of FIG. 1 with its side and top exterior walls removed to display the internal components thereof showing air circulation through the air treatment unit.

A water treatment unit 100 is also provided in the casing 22 (FIG. 2). The water treatment unit 100, is connected to the water collecting container 65 by means of the pump 101 (FIG. 5) and includes one or more of, and preferably all of: particulate filters 102 and 103; an activated charcoal filter 104; and an ultraviolet light sterilizing chamber 106. Particulate filter 102 is a 50 μm (micron) filter; particulate filter 103 is a 5 μm (micron) filter. The activated charcoal filter 104 has a porosity of 5 μm. The particulate filters 102, 103 and the activated charcoal filter 104 are preferably cartridge filters. Ultraviolet light sterilizing chamber 106 comprises an ultraviolet lamp capable of irradiating water at a wavelength between 245 nm and 285 nm, preferably including 254 nm, at a sufficient dose and for a sufficient time period to sterilize microorganisms in the produced water. An alternative sterilization system such as an ozone injection system may be used. Particulate filters 102 and 103, and the activated charcoal filter 104 are connected in series.

The water treatment unit 100, comprises also a calcite media mineralization system 108 to add mineral salts or other additives to collected water to improve flavor, prevent bacteria, and provide essential dietary minerals to the collected water.

The mineralization system 108 is connected in series to the activated charcoal filter 104 and comprises two mineralization unit 108a connected in parallel between them and fluidly connected to the ultraviolet sterilizing chamber 106.

The purified water is then delivered to a storage tank 110. Storage tank 110 is desirably a 100 liter tank sized to hold collected water. Storage tank 110 is provided with an appropriate outlet valve system, so that collected water in storage tank 110 may be dispensed into jugs, water trucks, or to a local sanitary water distribution piping system.

A manual hatch door 226 (FIG. 1), on an end wall 22c, of the casing 22, provides access to the water treatment unit 100.

An electric generator system 120 (FIG. 3) is optionally located in or on the casing 22, and, according to present embodiment of the invention the generator system 120 is co-located with the water treatment unit 100.

The electric generator system 120 generates electrical power to operate the air treatment unit 40, the chiller unit 80, the water treatment unit 100, and all the electrical components provided in the atmospheric water generation system. The electric generator system 120 may comprise: an internal combustion engine generator, or a hydrogen fuel cell; or a solar panel system.

According to the disclosed embodiment of the invention the electric generator system 120 is a self-contained diesel engine 122 and an electric generator 124. Diesel engine 122 and an electric generator 124 desirably have a capacity of at least 250 kW, with an optional range of up to 400 kW. The diesel engine includes a 120 liter fuel tank 126, and heavy duty air and oil filter systems. The electric generator 124 is a synchronous three phase alternator.

The casing 22 (FIG. 1) comprises an air vent 220 for supplying fresh air to the diesel engine and an exhaust gas vent 224 for discharging exhaust gas from the engine. In detail, the air vent 220 and the exhaust gas vent 224 are provided with adjustable louvered shutters. A manual hatch door 226, on side 22a of the casing 22, provides access to the generator system 120.

The three main component elements—the air treatment unit 40, the water treatment unit 100 with the chiller unit 80; and the generator system 120; are designed as modular components. Each modular component has a length of about 4 meters. The modular design of the present invention provides a great deal of flexibility. The above noted three main component elements can be placed in casing 22 in various combinations as needed. This permits a convenient modular approach to fabricating each atmospheric water generation system 20.

Furthermore, in some embodiments, for example, where a generator system 120 is not required within casing 22 due to the availability of line power from a central electrical generating system, the generator system 120 may be omitted and a second air treatment unit 40 and a water treatment unit 100 may be located in the container 22 to increase water output.

Appropriate inspection doors and hatches 206, 208, 210 allow access to the various components of the air treatment unit.

All the louvers, doors, and hatches are closed when the system 20 is transported or when dust storms or other bad weather events occur to protect the system components and they can then be opened when the system is operated.

The operation of the atmospheric water generation system 20 is controlled by an appropriate control system which coordinates the operation of the system components and collects and acts on data collected by sensors in the system.

From the above disclosure it is evident that the atmospheric water generation system 20 is easily transported using existing intermodal transport systems. It can be supplied in a self contained system that can be delivered to disaster sites such as areas devastated by floods, tsunamis, or other disasters which disrupt water supplies. It can be transported to tropical locations such as islands and to remote areas in need of water.

The present invention is therefore a new and nonobvious invention that can assist in providing clean water resources to the parts of the world where water is badly needed.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

What is claimed is:

1. An atmospheric water generation system, comprising:
a casing into which an air treatment unit and a chiller unit are located,
the casing having:
a first air inlet for supply of ambient air to the air treatment unit,
a first air outlet for discharge of cold air from the air treatment unit,
a second air inlet for supply of ambient air to the chiller unit, and
a second air outlet for discharge of hot air from the chiller unit, a closing member provided with each of the first and second air inlets and first and second air outlets, so that all the first and second air inlets and first and second air outlets can be closed at the same time, and
the first air outlet is located on a side of the casing and the closing member provided with the first air outlet is a first air outlet door hinged to a vertical edge of the first air outlet and configured to be rotated between a closed position, and an open position, wherein the first air outlet door in an open position is rotated to an angle in a range between 30° and 80° with respect to the side of the casing, and
the second air inlet is located on the same side of the casing as the first air outlet, the first air outlet door in an open position directing the discharge of cold air from the air treatment unit to the second air inlet for supply of ambient air to the chiller unit.

2. The atmospheric water generation system of claim 1, wherein the closing member provided with the first air inlet is a louvered shutter.

3. The atmospheric water generation system of claim 1, wherein the angle of the first air outlet door in an open position is 60° with respect to the side of the casing.

4. The atmospheric water generation system of claim 1, wherein the closing member provided with the second air inlet comprises a second air inlet door hinged to a horizontal edge of the second air inlet.

5. The atmospheric water generation system of claim 4, wherein the second air inlet door is configured to be rotated between a first closed position wherein it closes said second air inlet, and a second open position wherein it is located in a horizontal plane perpendicular to the side allowing the flow of the ambient air towards the chiller unit.

6. The atmospheric water generation system of claim 5, wherein the rotation of the door is performed by means of a linear actuator.

7. The atmospheric water generation system of claim 1, wherein the closing member provided with the second air outlet comprises a second air outlet door.

8. The atmospheric water generation system of claim 7, wherein the second air outlet door is configured to be rotated between a first closed position wherein the door closes said second air outlet, and a second open position wherein the door is located in a plane perpendicular to the ceiling allowing the flow of the ambient air from the chiller unit towards the environment.

9. The atmospheric water generation system of claim 8, wherein the rotation of the door is performed by means of a linear actuator.

10. The atmospheric water generation system of claim 1, further comprising a water treatment unit located in the casing.

11. The atmospheric water generation system of claim 10, wherein the water treatment unit and an electric generator system are co-located adjacent each other within the casing.

12. The atmospheric water generation system of claim 1, further comprising an electrical generator system located in or on the casing.

13. An atmospheric water generation system, comprising:
a casing into which an air treatment unit and a chiller unit are located,
the casing having:
a first air inlet for supply of ambient air to the air treatment unit,
a first air outlet for discharge of cold air from the air treatment unit,
a second air inlet for supply of ambient air to the chiller unit, and
a second air outlet for discharge of hot air from the chiller unit,
a closing member provided with each of the first and second air inlets and first and second air outlets, so that all the first and second air inlets and first and second air outlets can be closed at the same time, and wherein the first air outlet is located on a side of the casing and the closing member provided with the first air outlet is a first air outlet door hinged to a vertical edge of the first air outlet and configured to be rotated between a closed position, wherein the first air outlet door is co-planar with the external surface of a side of the casing, and an open position, wherein the first air outlet door in an open position is rotated to an angle in a range between 30° and 80° with respect to the side of the casing, wherein the second air inlet is located on the same side of the casing as the first air outlet, and the closing member provided with the second air inlet is a second air inlet door hinged to a horizontal edge of the second air inlet, wherein the first air outlet door in an open position extends toward the second air inlet;

whereby the first air outlet door in an open position directs the discharge of cold air from the air treatment unit to the second air inlet when the second air inlet door is in an open position allowing the flow of cold air from the air treatment unit to the chiller unit.

14. The atmospheric water generation system of claim 13, wherein the angle of the first air outlet door in an open position is 60° with respect to the side of the casing.

15. The atmospheric water generation system of claim 13, wherein the second air inlet door is configured to be rotated between a first closed position wherein it closes said second air inlet, and a second open position wherein it is located in a horizontal plane perpendicular to the side.

16. The atmospheric water generation system of claim 15, wherein the closing member provided with the second air outlet comprises a second air outlet door provided in a top surface of the casing.

17. The atmospheric water generation system of claim 16, wherein the second air outlet door is configured to be rotated between a first closed position wherein the second air outlet door closes said second air outlet, and a second open position wherein the door is located in a plane perpendicular to the casing.

18. The atmospheric water generation system of claim 17, wherein separate linear actuators are affixed to the casing and the first air outlet door, the second air inlet door, and the second air outlet door to rotate the first air outlet door, the second air inlet door, and the second air outlet door respectively.

19. The atmospheric water generation system of claim 13, further comprising a water treatment unit located in the casing.

20. The atmospheric water generation system of claim 19, wherein the water treatment unit and an electric generator system are co-located adjacent each other within the casing.

* * * * *